J. BARRETT.
SPRAYER ATTACHMENT.
APPLICATION FILED JUNE 5, 1920.
1,374,274.
Patented Apr. 12, 1921.
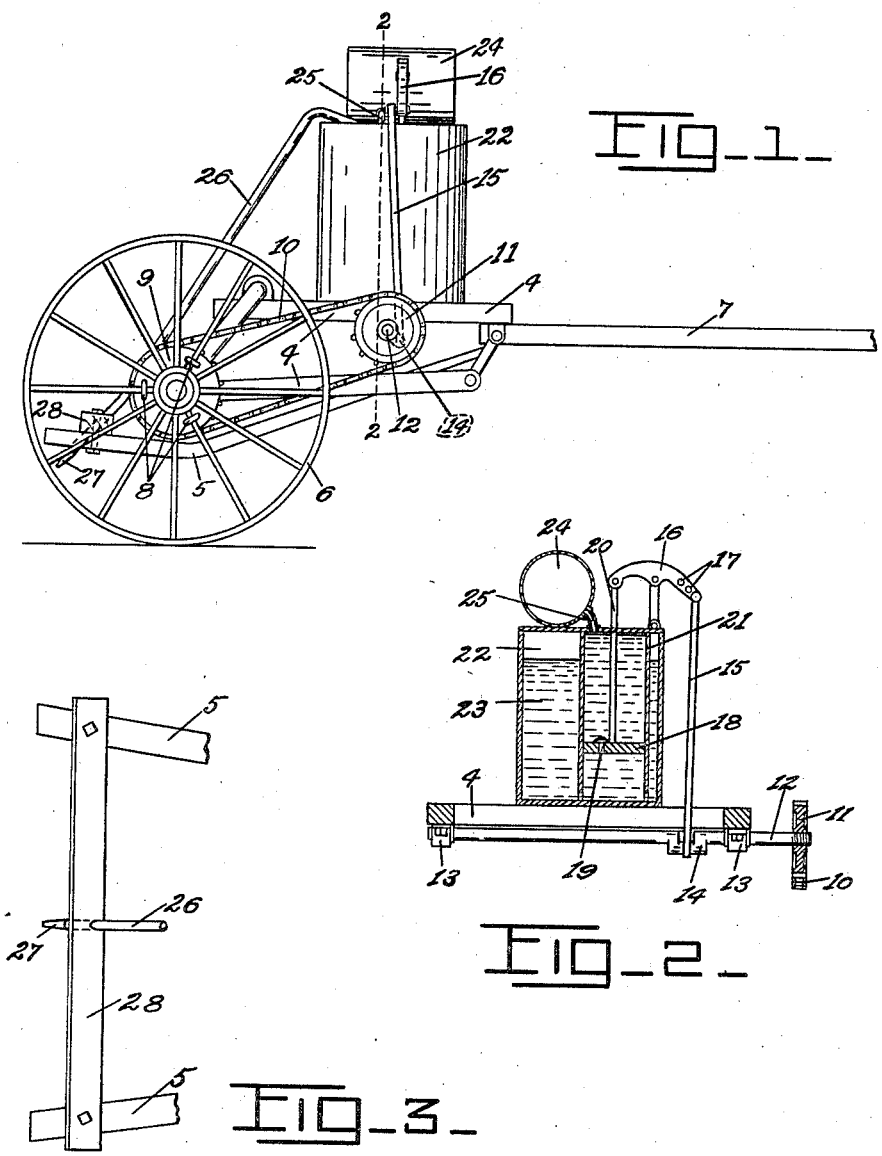
Inventor
JAMES BARRETT
By A. E. Carlsen.
Attorney

UNITED STATES PATENT OFFICE.

JAMES BARRETT, OF MURDOCK, MINNESOTA.

SPRAYER ATTACHMENT.

1,374,274.  Specification of Letters Patent.  Patented Apr. 12, 1921.

Application filed June 5, 1920. Serial No. 386,754.

*To all whom it may concern:*

Be it known that I, JAMES BARRETT, a citizen of the United States, residing at Murdock, in the county of Swift and State of Minnesota, have invented certain new and useful Improvements in Sprayer Attachments, of which the following is a specification.

This invention relates to spraying devices and the object is to provide an improved form of sprayer adapted to be used on and in conjunction with a cultivator or other form of farm implement. The invention is clearly illustrated in the accompanying drawing, in which:

Figure 1 is a side elevation of the frame construction of a cultivator equipped with my improved detachable sprayer.

Fig. 2 is a sectional view substantially on the line 2—2 in Fig. 1.

Fig. 3 is a top view of a portion of Fig. 1.

Referring to the drawing by reference numerals, 4 designates a well known type of cultivator frame having a cultivator tooth supporting frame 5 suitably suspended therebeneath. The cultivator is provided with the customary supporting wheels 6 and draft tongue 7. Secured upon the inner side of one of the wheels 6, preferably by U-bolts 8, is a sprocket gear 9, which by means of a chain 10 drives a sprocket gear 11. The gear 11 is secured upon the end of a shaft 12 which is journaled in suitable bearings 13 on the frame 4. The shaft 12 is provided with a crank 14 which is connected by a connecting rod 15 to a pump lever 16, the latter being provided with several holes 17, so that adjustments may be made in the stroke of the pump piston 18. The piston 18 is provided with a valve 19 and is connected by a piston rod 20 to the lever 16. The pump casing 21 is positioned within a suitable container or tank 22 in which is held the spraying liquid 23. An air compression tank 24 is located upon the top of the container 22, and is connected by a short pipe 25 to the top of the pump cylinder. An outlet tube 26 also leads from the top of the pump and terminates at its other end in any suitable form of spraying nozzle 27. The lower end of the hose 26 is supported in an inclined aperture in a brace 28 which is bolted at its ends to the frame 5. When so desired the brace may be inverted end for end; thus the direction of the nozzle may be inclined either forwardly or rearwardly.

The operation of the device is quite obvious. With the various parts as above described in position on the implement, the spraying is accomplished simultaneously with the harrowing or cultivating for which the implement is designed; for, as the wheel 6 revolves the pump is continually operated and the spraying liquid is gradually pumped from the container 22 out through the hose 26 and nozzle 27. The object of the tank 24 is to provide a yielding air pressure on the liquid in the upper part of the pump so that a more even pressure will be imparted to the liquid sprayed.

It is understood that suitable modification may be made in the form and structure of this invention if such modifications come within the scope of the appended claim.

Having now therefore fully shown and described my invention what I claim to be new and desire to protect by Letters Patent is:

In combination with a wheel supported implement having a pair of rearwardly extending beams, of a transverse brace secured at each end to the rear of one of said beams, said brace having a rearwardly inclined aperture at its middle adapted to hold a nozzle, a hose having said nozzle at one end, and means at the other end of the hose for forcing liquid therethrough.

In testimony whereof I affix my signature.

JAMES BARRETT.